(12) United States Patent
Triebold et al.

(10) Patent No.: US 9,151,342 B2
(45) Date of Patent: Oct. 6, 2015

(54) CONE ROLLER LOCK DEVICE

(71) Applicant: Reell Precision Manufacturing Corporation, St. Paul, MN (US)

(72) Inventors: Allan Triebold, Cottage Grove, MN (US); John Nutter, Stacy, MN (US); George D. Larson, Roseville, MN (US)

(73) Assignee: Reell Precision Manufacturing Corporation, St. Paul, MN (US)

(*) Notice: Subject to any disclaimer, the term of this patent is extended or adjusted under 35 U.S.C. 154(b) by 0 days.

(21) Appl. No.: 14/300,484

(22) Filed: Jun. 10, 2014

(65) Prior Publication Data

US 2015/0129387 A1     May 14, 2015

Related U.S. Application Data (62) Division of application No. 12/908,609, filed on Oct. 20, 2010, now Pat. No. 8,746,417.

(60) Provisional application No. 61/253,416, filed on Oct. 20, 2009.

(51) Int. Cl.
  *F16D 41/061* (2006.01)
  *F16D 41/08* (2006.01)

(52) U.S. Cl.
  CPC ............ *F16D 41/061* (2013.01); *F16D 41/086* (2013.01); *Y10T 403/32295* (2015.01); *Y10T 403/32501* (2015.01); *Y10T 403/7071* (2015.01)

(58) Field of Classification Search
  CPC ..... F16D 41/061; F16D 41/086; F16D 41/06; Y10T 403/32295
  See application file for complete search history.

(56) References Cited

U.S. PATENT DOCUMENTS

| | | | |
|---|---|---|---|
| 2,293,095 | A | 8/1942 | Anderson |
| 3,066,551 | A | 12/1962 | Burnham |
| 3,761,206 | A | 9/1973 | Fierstine |
| 5,103,941 | A | 4/1992 | Vranish |
| 5,392,887 | A | 2/1995 | Nisenson |

(Continued)

FOREIGN PATENT DOCUMENTS

| | | |
|---|---|---|
| DE | 102005016934 A1 | 10/2006 |
| JP | 2006077878 A * | 3/2006 |
| JP | 2006097888 | 4/2006 |

OTHER PUBLICATIONS

The Written Opinion of the International Searching Authority for International Application No. PCT/US2010/053405 mailed Jan. 5, 2011 (6 pages).

(Continued)

*Primary Examiner* — Rodney H Bonck
*Assistant Examiner* — Lillian Nguyen
(74) *Attorney, Agent, or Firm* — Dicke, Billig & Czaja, PLLC (57) ABSTRACT

A roller lock device has a shaft and a housing configured over the shaft for selective relative movement thereto. A plurality of rollers is configured between the housing and the shaft, at least some of which are substantially conically shaped. A cage is configured between the housing and the shaft and adjacent the rollers such that the rollers are at least partially constrained from movement by the cage. A control is configured to move the rollers axially thereby engaging and disengaging the roller lock. The housing has ramps configured to receive the rollers, the ramps having a curved contour.

17 Claims, 10 Drawing Sheets

(56) References Cited

U.S. PATENT DOCUMENTS

| | | |
|---|---|---|
| 7,510,057 B2 | 3/2009 | Kiener et al. |
| 8,746,417 B2 * | 6/2014 | Triebold et al. ............... 188/67 |
| 2002/0046914 A1 | 4/2002 | Saiko |
| 2004/0089510 A1 | 5/2004 | Ishizaka et al. |
| 2005/0115358 A1 | 6/2005 | Hamasaki et al. |
| 2007/0246309 A1 | 10/2007 | Kiener et al. |
| 2011/0091270 A1 | 4/2011 | Triebold et al. |

OTHER PUBLICATIONS

The International Search Report for International Application No. PCT/US2010/053405 mailed Jan. 5, 2011 (5 pages).

The Office Action for U.S. Appl. No. 12/908,609 mailed Nov. 16, 2012 (6 pgs.).

The Office Action for U.S. Appl. No. 12/908,609 mailed Jan. 2, 2013 (17 pgs.).

The Office Action for U.S. Appl. No. 12/908,609 mailed Jun. 11, 2013 (12 pgs.).

The Applicant-Initiated Interview Summary for U.S. Appl. No. 12/908,609 mailed Aug. 20, 2013 (3 pgs.).

The Office Action for U.S. Appl. No. 12/908,609 mailed Sep. 24, 2013 (13 pgs.).

The Notice of Allowance U.S. Appl. No. 12/908,609 mailed Jan. 29, 2014 (7 pgs.).

* cited by examiner

CONE ROLLER LOCK DEVICE

CROSS REFERENCE TO RELATED APPLICATIONS

This application is a divisional of U.S. patent application Ser. No. 12/908,609, entitled "CONE ROLLER LOCK DEVICE," having a filing date of Oct. 20, 2010, which claims the benefit of U.S. Provisional Patent Application Ser. No. 61/253,416, filed Oct. 20, 2009, entitled "CONE ROLLER LOCK PIVOT, which are herein incorporated by reference.

BACKGROUND

The present invention relates to applications in which a pivoting or a translating action occurs between two members. More particularly, it relates to a pivot for translation with high stiffness locking and infinite positioning in both directions while maintaining a relatively low release force.

In some applications, bi-directional locking is useful between two members moving relative to each other. Such applications include seat back adjustments for electric wheel chairs, leg support adjustments for wheel chairs, adjustable handles for power-assist manipulators, TV or monitor supports, and other relative movement applications. In such applications, accurate and infinite positioning under reversing load conditions is useful. Such applications also involve significant loading forces.

In these applications, typically bi-directional locking is desired and also high stiffness, which gives the user a tactile feeling of solidity. Furthermore, it is attempted to minimize deflection under load, that is, the feeling of "springiness". Often these devices will not release while under load, and will only release when the load drops below a particular threshold level, and an input is deliberately applied to break the release mechanism. In some applications, bi-directional dual wrap spring devices are used for this function. Under reversing load, however, the output of a dual wrap spring device will begin reverse movement through a zone of reduced torque and then increasing torque, until the break locks in the reverse direction. This movement between full breaking engagement when reversing directions is sometimes referred to as "backlash" or "low system stiffness." It is often difficult to minimize or prevent this movement under reversing load.

Other applications use opposed straight roller ramp locks in an attempt to overcome low system stiffness. Straight rollers on a straight shaft, however, have a tendency to "self lock" requiring large release forces after the applied load is removed. For these and other reasons, a need exists for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
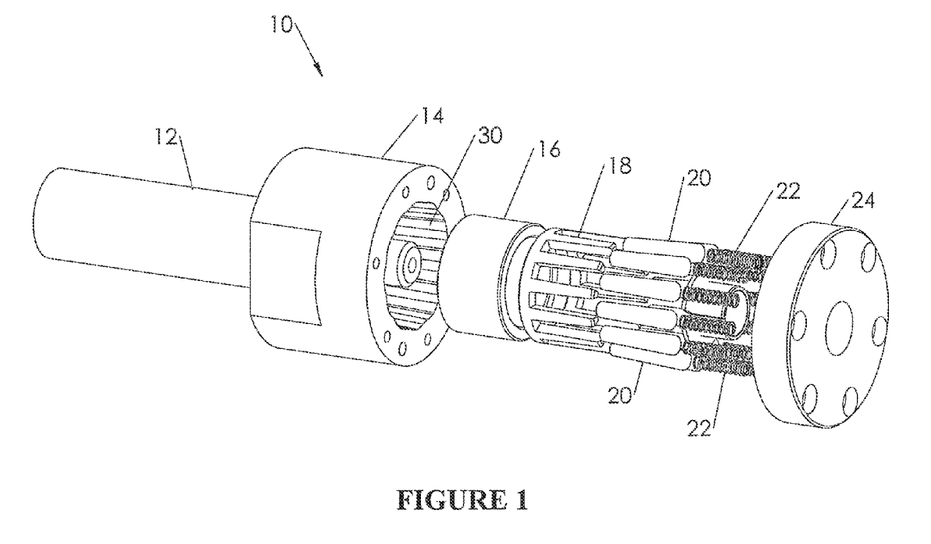
FIG. 1 illustrates an exploded view of a roller lock device in accordance with one embodiment.

FIG. 1 illustrates roller lock device 10 in accordance with one embodiment. Roller lock device 10 includes shaft 12, housing 14, control sleeve 16, cage 18, rollers 20, roller springs 22, and spring cap 24. In one embodiment, roller lock device 10 allows shaft 12 and housing 14 to be pivoted or rotated relative to each other in both clockwise and counter clockwise directions.

In operation, roller lock device 10 can be alternatively locked and unlocked with axial actuation of control sleeve 16, such that shaft 12 and housing 14 are alternatively prevented from and allowed relative rotation. In an "engaged" or "locked" state of roller lock device 10, a load can be supported relative to either shaft 12 or housing 14. In this state, control sleeve 16 is moved in lock direction 15 (see, FIG. 2) thereby allowing rollers 20 to move away from spring cap 24 under force from roller springs 22. This causes rollers 20 to wedge between shaft 12 and housing 14, thereby preventing their relative rotation and supporting the attached load.

In one embodiment, roller lock device 10 can be released from this locked state into an "unlocked" or "disengaged" state upon actuation of control sleeve 16 in the release direction 17. In this state, when control sleeve 16 is moved in release direction 17 it forces rollers 20 toward spring cap 24 overcoming the force from roller springs 22. This causes rollers 20 to move out of the wedged position between shaft 12 and housing 14, thereby releasing roller lock device 10 from the locked state allowing relative rotation of shaft 12 and housing 14, and allowing the load to move from its supported position. In one embodiment, the release force required to release control sleeve 16 is independent of the applied load to either shaft 12 or housing 14, once the load is removed.

Figure 2:
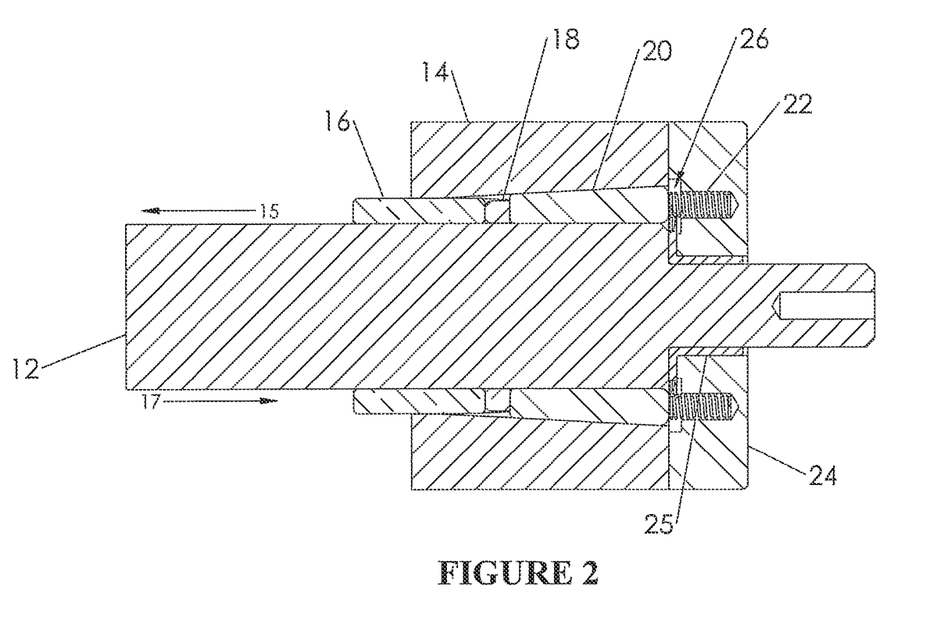
FIG. 2 illustrates a cross-sectional view of a roller lock device in accordance with one embodiment.

FIG. 2 illustrates a cross-sectional view of roller lock device 10 in accordance with one embodiment. As evident in the figure, rollers 20 are frusto-conical shaped, that is, shaped as truncated cones having a larger diameter at one end and tapering to a smaller diameter at an opposite end. As also illustrated in the figure, in one embodiment shaft 12 is straight, having a constant diameter along its length. Also illustrated in FIG. 2 is a bushing 25 between shaft 12 and spring cap 24.

Although some cone-roller configurations are known in the art, the combination of a straight shaft and cone-shaped roller creates difficulty in maintaining uniform contact between the cone-shaped rollers and the uniform shaft. Since one end of the roller will travel farther than the other end during a given rotation along the uniform shaft, there is unevenness. As a result, there can be slippage between them, a decrease in system stiffness, or both. As a result, such devices typically have been characterized by a low load carrying capacity.

In one embodiment of roller lock device 10, however, housing 14 is configured with corresponding ramps 30 within housing 14 that are configured to receive cone-shaped rollers 20. In one embodiment, ramps 30 are configured such that relatively uniform contact is maintained between rollers 20 and shaft 12 and between rollers 20 and ramp 30.

Figure 3:
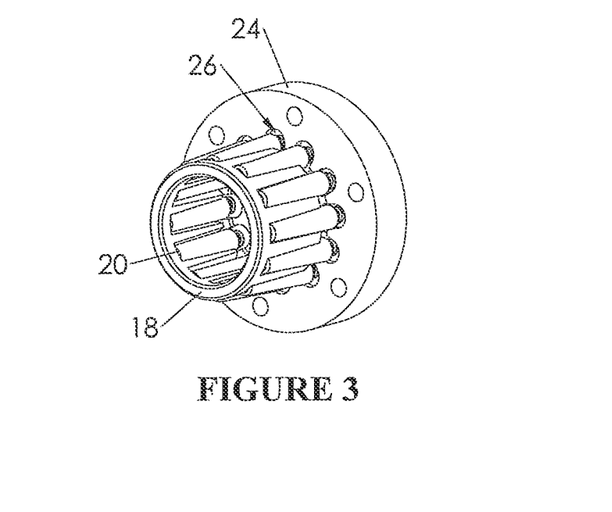
FIG. 3 illustrates a portion of a roller lock device in accordance with one embodiment.

FIG. 3 illustrates a portion of roller lock device 10, including cage 18, rollers 20, roller springs 22 (better illustrated in FIGS. 2 and 4) and spring cap 24. Cage 18 is configured to receive each of rollers 20 and to position and align them for contact between housing 14 and shaft 12. In one embodiment, cage 18 is configured to engage control sleeve 16 such that cage 18 and rollers 20 all move axially in the lock and release directions 15 and 17 with application of force to control sleeve 16.

Figure 4:
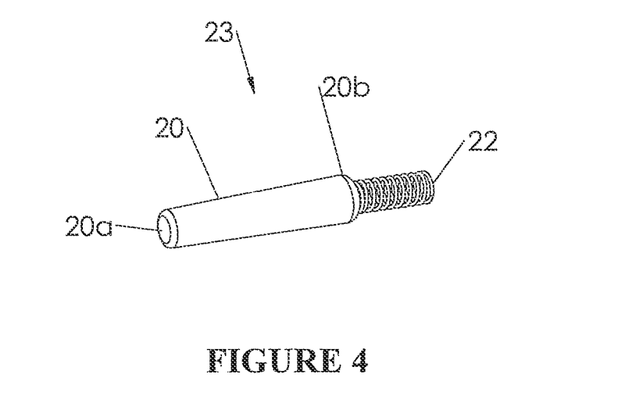
FIG. 4 illustrates a roller assembly in accordance with one embodiment.

FIG. 4 illustrates a roller assembly 23, including roller 20 and roller spring 22. One end of roller 20 has a larger diameter 20b and the other end has a smaller diameter 20a. In one embodiment, each roller 20 has a corresponding roller spring 22 extending from one of its ends. In one embodiment, spring 22 extends into the larger diameter 20b end of roller 20. Because of the unequal diameters of the ends of rollers 20, rollers 20 tend to move out of axial alignment with shaft 12 during rotation. Cage 18 aligns each of rollers 20 to ensure they remain substantially parallel to shaft 12 during rotation.

Figure 5:
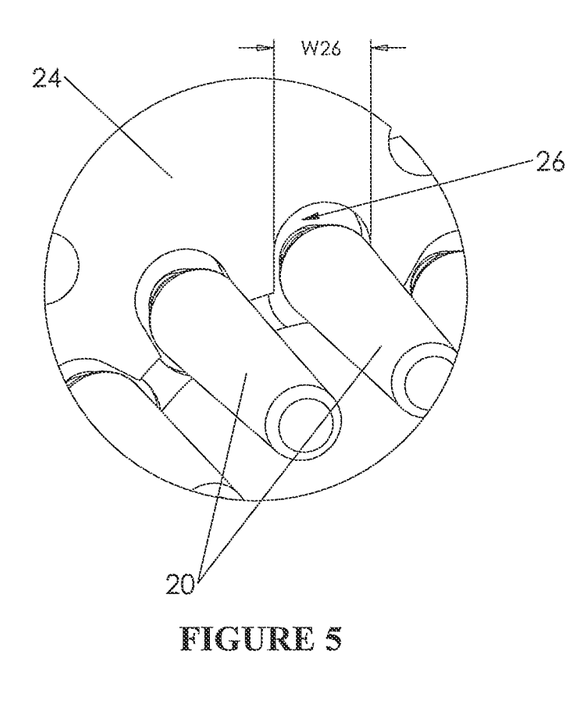
FIG. 5 illustrates a portion of a roller lock device, including a centering feature, in accordance with one embodiment.

In one embodiment, spring 22 sits in centering feature 26 on spring cap 24. FIG. 5 illustrates rollers 20 seated in respecting centering features 26. In one embodiment, centering feature 26 is recessed relative to a surface of spring cap 24 and can thereby receive the larger diameter 20b end of roller 20. When roller lock device 10 is moved to its unlocked state, each of rollers 20 are pushed axially along the shaft 12 toward spring cap 24 so that they no longer contact housing 14. In order to ensure that none of rollers 20 contact housing 14 when released, centering features 26 are provided keep rollers 20 axially aligned with shaft 12 by engaging the larger diameter 20b end. In one embodiment, the width $W_{26}$ of centering feature 26 is slightly larger than the radius across the larger diameter 20b end of roller 20, such that roller 20 can move slightly in a perpendicular direction to shaft 12, yet still be contained in centering feature 26 to remain substantially parallel to shaft 12.

Figure 6:
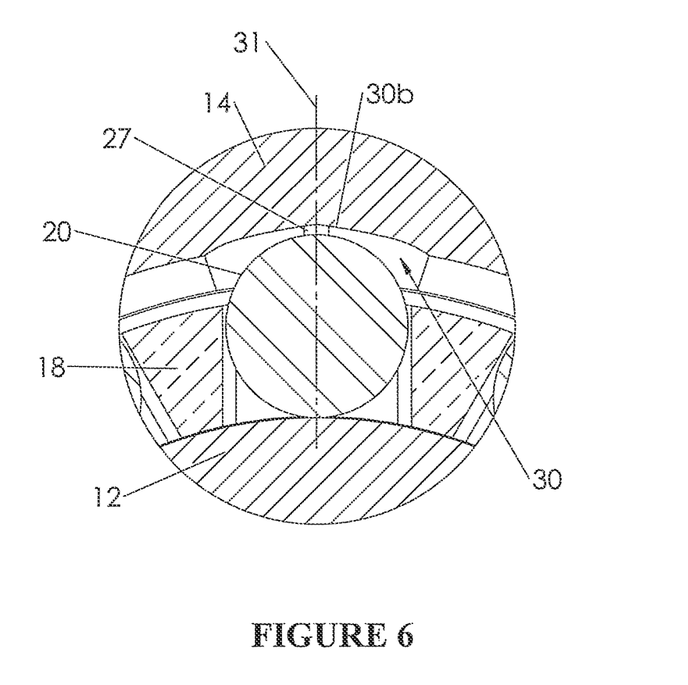
FIG. 6 illustrates a sectional view of a portion of a roller lock device, including a roller, in accordance with one embodiment.

FIG. 6 illustrates a portion of roller lock device 10. A portion of housing 14 is illustrated above a roller 20, which in turn is illustrated above shaft 12. A ramp 30 is illustrated in housing 14 adjacent roller 20. In the figure, roller lock device 10 is in the unlocked state, such that there is gap 27 between roller 20 and housing 14 such that housing 14 and shaft 12 are free to rotate relative to each other without having roller 20 wedge against ramp 30, between housing 14 and shaft 12.

Along with centering feature 26, housing 18 further ensures that roller 20 stays axially aligned with shaft 12, that is, prevented from left and right movement as illustrated in FIG. 6, such that roller 20 does not prematurely wedge against ramp 30. If rollers 20 were not forced to the center of the housing ramp 30, they could move and contact ramp 30 in one direction or the other, which would stop the motion in that direction, resulting in premature locking.

When roller lock device 10 is transitioned from the unlocked state illustrated in FIG. 6 to its locked state, rollers springs 22 push rollers 20 into ramps 30—pushing rollers 20 into the page as illustrated in FIG. 6. When this occurs, and before there is relative rotation between shaft 12 and housing 14, roller lock device 10 is in a "neutral state." In this neutral state, roller 20 has two lines of contact with ramp 30—one on either side of a ramp center axis 31 and one line of contact with shaft 12. Each of these lines of contact runs axially parallel with shaft 12.

As relative rotation is introduced between shaft 12 and housing 14, in either direction, roller 20 will retain two lines of contact: one line of contact with shaft 12 and one line of contact with ramp 30. The line of contact maintained with ramp 30 will be on the side of center axis 31 toward which roller 20 is moving under the introduced rotational force. In this way, roller lock device 10 is a true bi-directional device in that a line of contact is maintained with ramp 30 as the device transitions from neutral to engaged states no matter which direction of rotation is introduced. Maintaining the lines of contact between both shaft 12 and housing 14 will minimize free play between shaft 12 and housing 14, and maximum engagement.

Figure 7:
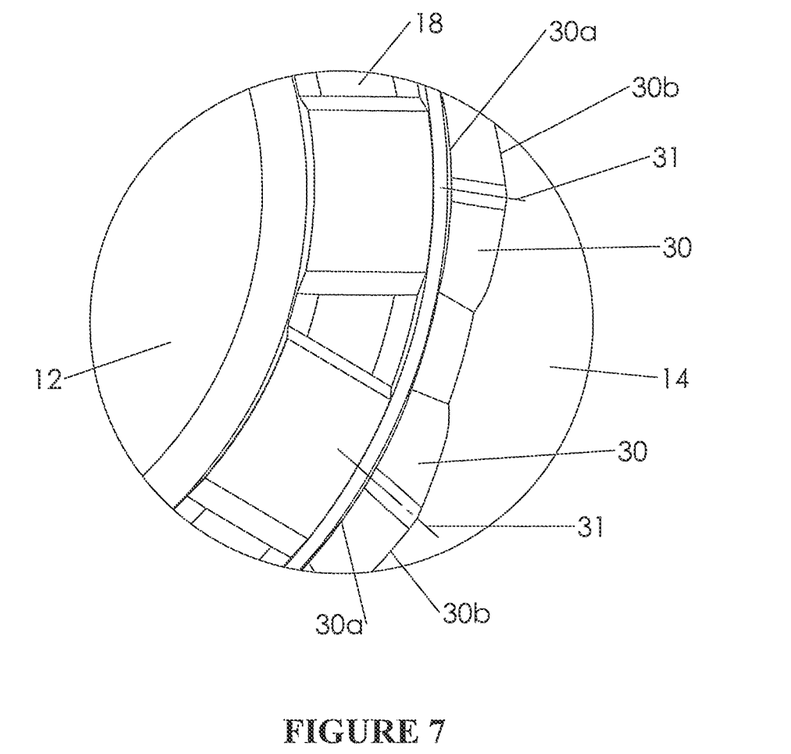
FIG. 7 illustrates a portion of a roller lock device, including a ramp in a housing, in accordance with one embodiment.
Figure 8:
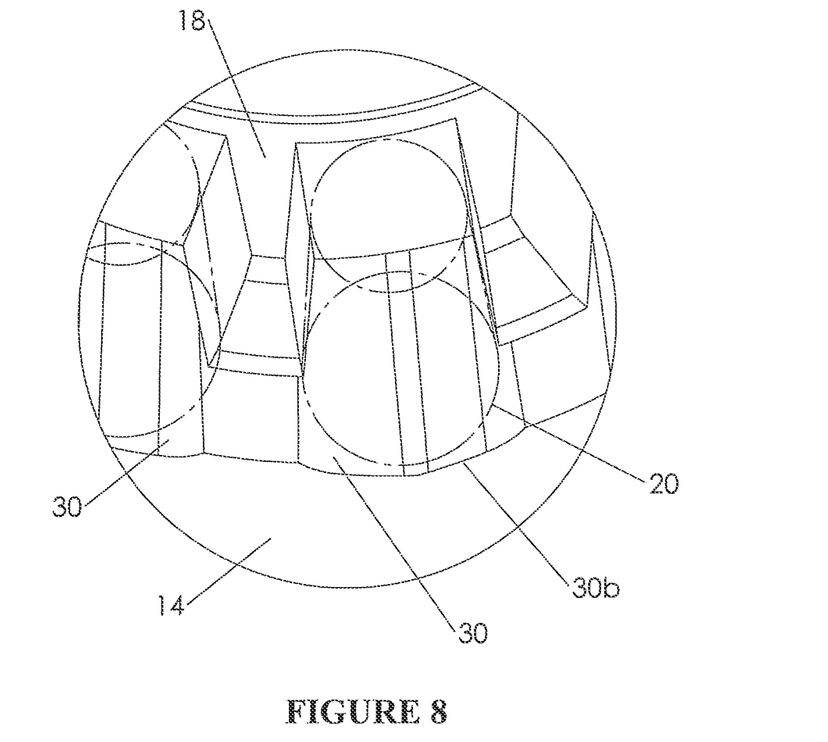
FIG. 8 illustrates a portion of a roller lock device, including a ramp in a housing, in accordance with one embodiment.

FIGS. 7 and 8 illustrate a portion of roller lock device 10 and further illustrate ramps 30 of housing 14. In FIG. 8, roller 20 is shown ghosted with partially dotted lines to better view ramp 30. In one embodiment, ramp 30 is configured to ensure that an optimum angle is maintained during loading thereby ensuring roller lock device 10 has a maximum stiffness in operation.

Each ramp 30 has a ramp center axis 31 along which roller 20 can be axially aligned. Because rollers 20 are conically shaped with a smaller diameter 20a at one end and a larger diameter 20b at another, ramp 30 is accordingly configured to have a smaller ramp side 30a at one end (adjacent the smaller diameter 20a of roller 20) and a larger ramp side 30b at another end (adjacent the larger diameter 20b of roller 20). In one embodiment, ramp 30 is symmetrical about its center axis 31, and thus, about the center of roller 20.

Figure 9:
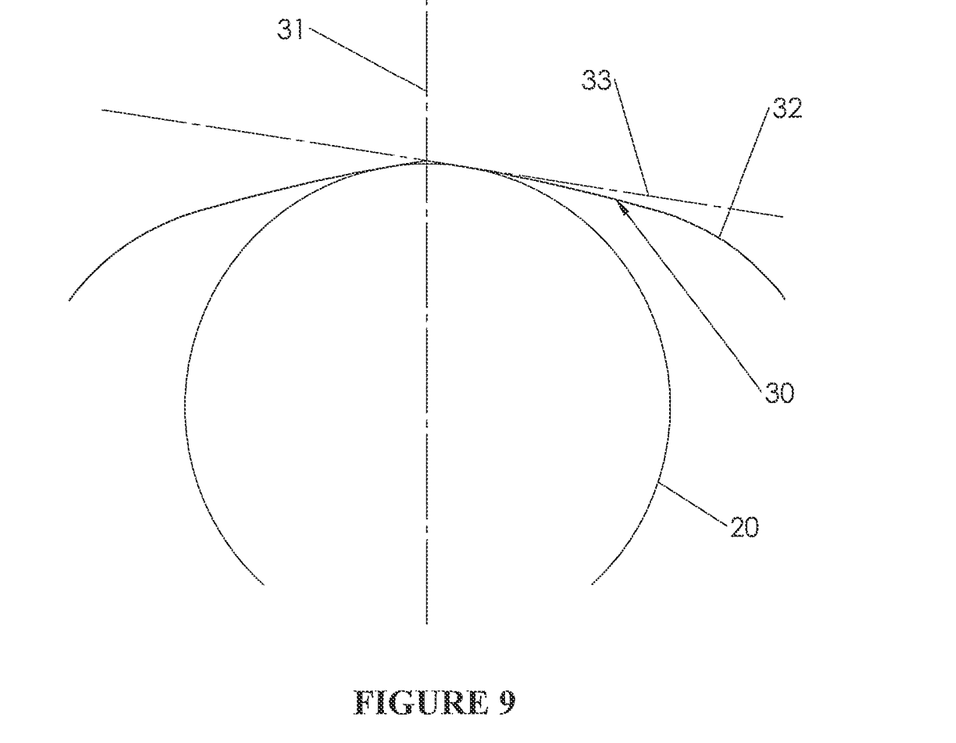
FIG. 9 is a diagram representing a portion of a ramp from a housing in a roller lock device in accordance with one embodiment.

In one embodiment, ramp 30 is configured with a curved surface having an increasing ramp angle as the surface moves from center axis 31. FIG. 9 illustrates curved ramp surface 32 in accordance with one embodiment. In one embodiment, ramp 30 has a curved ramp surface 32, such that ramp angle gradually increases as roller moves out from the center axis 31 in both directions of ramp 30. A portion of roller 20 is illustrated adjacent ramp center axis 31.

As is evident, as roller 20 moves away from center axis 31 and along the curved ramp surface 32, the contour of ramp surface 32 gradually increases in angle. For a line of reference, a straight ramp 33 is provided to illustrate what a straight ramp would look like in comparison. Stated another way, the reference straight ramp 33 has a linear slope, whereas slope of ramp surface 32 varies nonlinearly.

A ramp 30 having the curved contour of curved ramp surface 32 increases stiffness of roller lock device 10, because roller 20 is contacting housing 14 at the desired ramp angle in both clockwise and counterclockwise directions of rotation between shaft 12 and housing 14 (since ramp 30 is symmetrical about center axis 31). As roller 20 moves away from ramp center axis 31 and along curved ramp surface 32, there is increasing compression force on roller 20 as it wedged between shaft 12 and housing 14.

Figure 10:
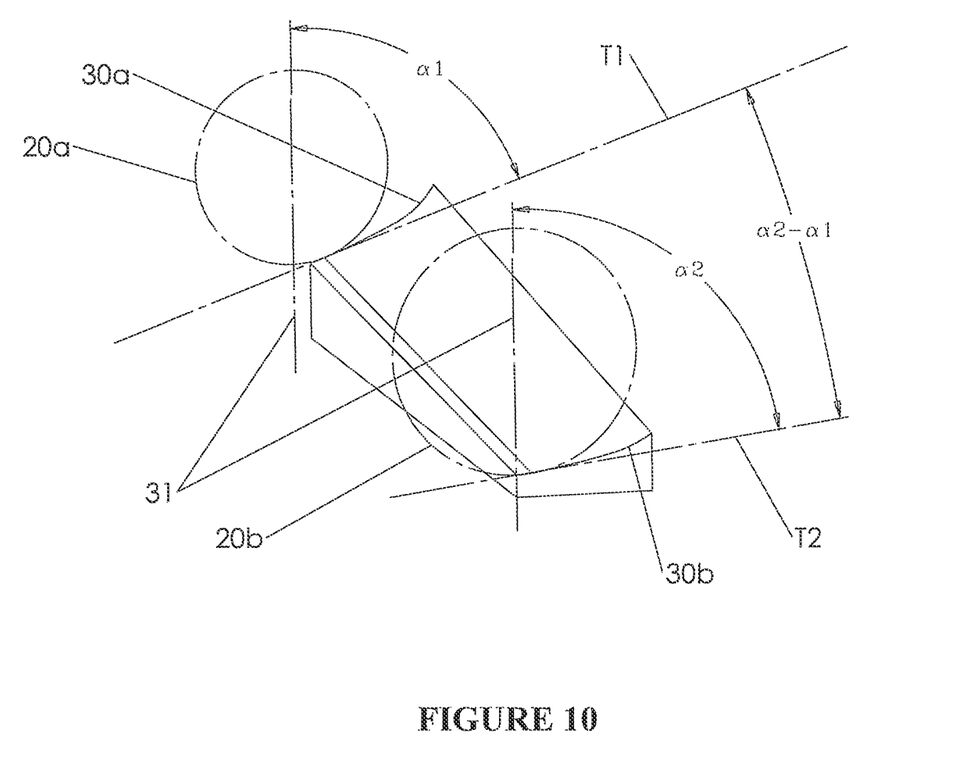
FIG. 10 is a diagram representing a ramp from a housing in a roller lock device in accordance with one embodiment.

In one embodiment, ramp 30 also has a twisted ramp surface. FIG. 10 is a diagram representing a ramp 30 from housing 14 in a roller lock device 10. In the illustration, ends of roller 20 are represented with circles. The larger circle represents the end of roller 20 with the larger diameter 20b, and it is adjacent a larger ramp edge 30b. The smaller circle represents the end of roller 20 with the smaller diameter 20a, and it is adjacent a smaller ramp edge 30a. As the conical roller 20 rolls on the straight shaft 12, the end of roller 20 with the larger diameter 20b will travel farther than will the end of roller 20 with the smaller diameter 20a.

In one embodiment, in order to equalize the stress between roller 20 and housing 14, ramp 30 is configured with twisted ramp surface having a shorter ramp edge 30a at one end and a longer ramp edge 30b at the other. This design helps to create a higher stiffness and helps to maximize the torque density of the design.

The twisted ramp surface of ramp 30 is further illustrated by comparing relative angles between tangent lines T1 and T2 and center axis 31. First tangent line T1 is defined by a line passing through tangent points at the end of smaller ramp edge 30a and second tangent line T2 is defined by a line passing through tangent points at the end of larger ramp edge 30b. The angle between tangent line T1 and center axis 31 is $\alpha 1$. The angle between tangent line T2 and center axis 31 is $\alpha 2$. The difference between these angles, $\alpha 2 - \alpha 1$, defines the twisted ramp surface of ramp 30.

Figure 11:
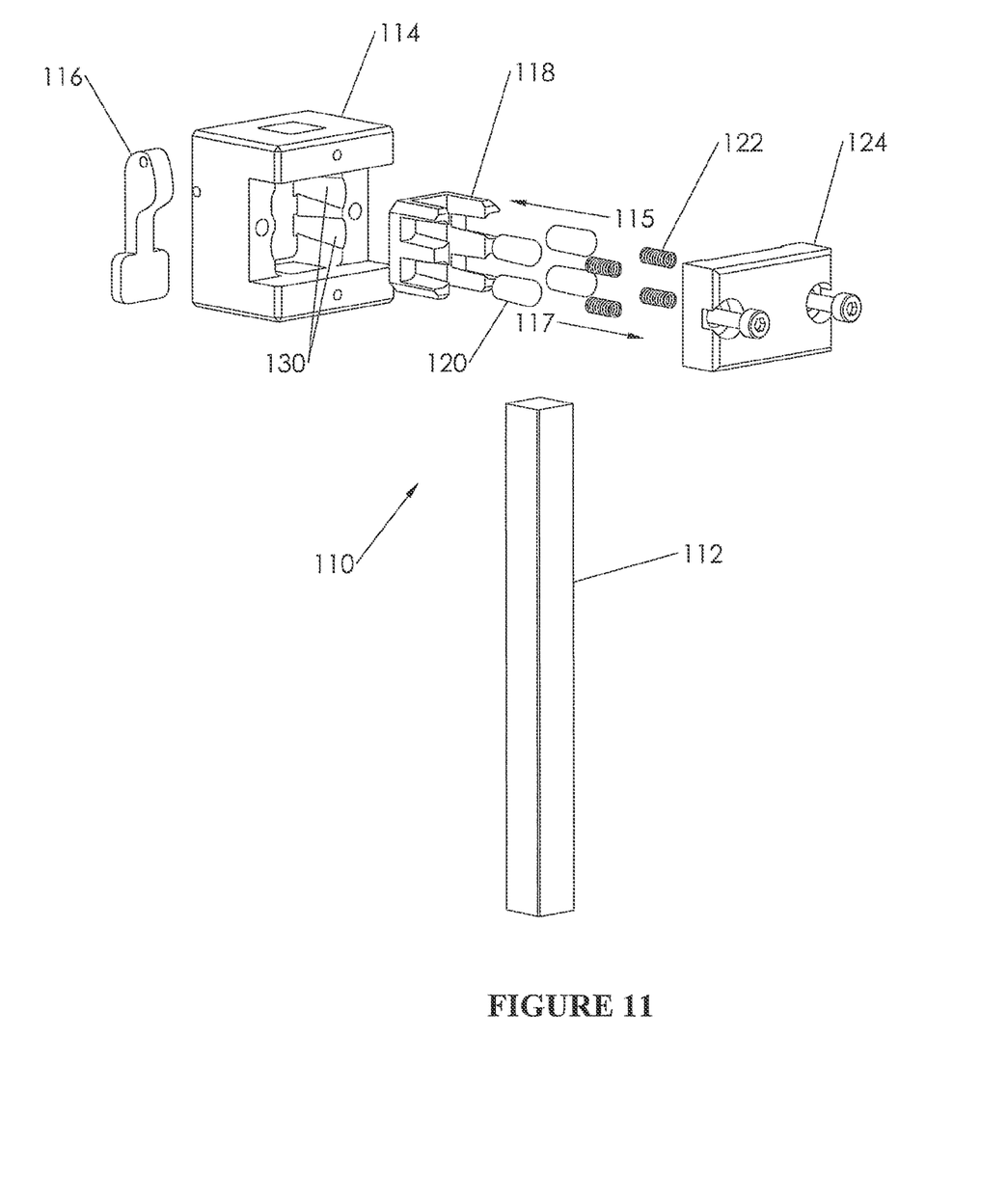
FIG. 11 illustrates an exploded view of a roller lock device in accordance with one embodiment.

FIG. 11 illustrates roller lock device 110 in accordance with one embodiment. Roller lock device 110 includes shaft 112, housing 114, including ramps 130, control switch 116, cage 118, rollers 120, roller springs 122, and spring cap 124. In one embodiment, roller lock device 110 allows shaft 112 to be linearly moved relative to housing 114, in both upward and downward directions, as depicted in the figure. The operation of the components of roller lock device 110 function similarly to those described above relative to roller lock device 10.

In operation, roller lock device 110 can be alternatively locked and unlocked with axial actuation of control switch 116, such that shaft 112 and housing 114 are alternatively prevented from and allowed relative movement. In a "locked" state of roller lock device 110, a load can be supported relative to either shaft 112 or housing 114. In this state, control switch 116 is moved in lock direction 115 thereby allowing rollers 120 to move away from spring cap 124 under force from roller springs 122. This causes rollers 120 to wedge between shaft 112 and housing 114, thereby preventing their relative motion.

In one embodiment, roller lock device 110 can be released from this locked state into an "unlocked" or "disengaged" state upon actuation of control switch 116 in the release direction 117. In this state, when control switch 116 is moved in release direction 117 it forces rollers 120 toward spring cap 124 overcoming the force from roller springs 122. This causes rollers 120 to move out of the wedged position between shaft 112 and housing 114, thereby releasing roller lock device 110 from the locked state allowing relative linear movement of shaft 112 through housing 114. In one embodiment, the release force required to release control switch 116 is independent of the applied load to either shaft 112 or housing 114.

As illustrated in FIG. 11, housing 114 includes ramps 130, which in one embodiment are configured with both curved and twisted surfaces as described above with respect to roller lock device 10. Again, as with roller lock device 10 above, rollers 120 are frusto-conical shaped, having a larger diameter at one end and tapering to a smaller diameter at an opposite end. Also as above, housing 114 and ramps 130 are configured to receive cone-shaped rollers 120 with both curved and twisted surfaces. As such, ramps 130 are configured such that relatively uniform contact is maintained between rollers 120 and shaft 112 and between rollers 120 and ramp 130. This ensures that an optimum angle is maintained during loading thereby ensuring roller lock device 110 has a maximum stiffness in operation.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A roller lock device comprising:
   a shaft configured for rotation about a shaft axis;
   a housing configured over the shaft for selective relative rotation about the shaft axis;
   a plurality of rollers configured between the housing and the shaft and in contact with the shaft, at least some of which are substantially conically shaped and each of which are configured to rotate about a roller axis, which extends the length of each roller and generally parallel to the shaft axis;
   a cage configured between the housing and the shaft and adjacent each of the plurality of rollers such that the rollers are at least partially constrained from movement by the cage; and
   a control configured to move the rollers axially relative to the shaft;
   wherein the housing comprises ramps configured with a ramp center axis extending parallel to and receiving the rollers, the ramps comprising a curved contour that is symmetrical about the ramp center axis thereby enabling bi-directional locking.

2. The roller lock device of claim 1, wherein the ramps have an increasing ramp angle moving away from the ramp center axis thereby forming the curved contour.

3. The roller lock device of claim 1, wherein the ramps comprise a twisted ramp surface.

4. The roller lock device of claim 3, wherein the ramps have first and second opposing ramp sides, wherein the first ramp side is longer than the second ramp side thereby creating a twisted ramp surface.

5. The roller lock device of claim 1, wherein axial movement of the rollers alternatively locks the roller lock device into a locked state where relative movement between the shaft and the housing is prevented, and unlocks the roller lock device into an unlocked state where relative movement between the shaft and the housing is allowed.

6. The roller lock device of claim 5, wherein a load is coupled to one of the shaft and the housing, such that the load is alternatively held and released as the roller lock device is alternatively locked and unlocked.

7. The roller lock device of claim 5, wherein the shaft is configured to rotate within the housing when the roller lock is in the unlocked state.

8. The roller lock device of claim 1 further comprising a spring cap coupled to the housing and configured with recesses to receive roller springs coupled to the rollers, the recesses comprising centering features for centering the rollers on a center axis of the ramps.

9. The roller lock device of claim 1, wherein the cage aligns each of the rollers to ensure they remain substantially axially aligned with the shaft during rotation.

10. The roller lock device of claim 1, wherein each of the plurality of rollers are substantially frusto-conically shaped.

11. The roller lock device of claim 1, wherein in a neutral state, each roller has two lines of contact with the ramp and one line of contact with the shaft, and wherein in a locked state each roller has one line of contact with the ramp and one line of contact with the shaft.

12. A roller lock device comprising:
a shaft configured for rotation about a shaft axis;
a housing configured over the shaft for selective relative rotation about the shaft axis;
a plurality of rollers configured between the housing and the shaft, at least some of which are substantially conically shaped and each of which are configured to rotate about a roller axis, which extends the length of each roller and generally parallel to the shaft axis;
a cage between the housing and the shaft and adjacent the rollers that at least partially constrains the rollers; and
a control that moves the rollers axially relative to the shaft;
wherein the housing comprises ramps with a ramp center axis extending parallel to and receiving the plurality of rollers, the ramps comprising a curved contour that is symmetrical about the ramp center axis.

13. The roller lock device of claim 12, wherein the ramps have an increasing nonlinear ramp angle moving away from the ramp center axis thereby forming the curved contour.

14. The roller lock device of claim 12, wherein the ramps have first and second opposing ramp sides, wherein the first ramp side is longer than the second ramp side thereby creating a twisted ramp surface.

15. The roller lock device of claim 12, wherein axial movement of the rollers alternatively locks the roller lock device into a locked state where relative rotation between the shaft and the housing is prevented, and unlocks the roller lock device into an unlocked state where relative rotation between the shaft and the housing is allowed.

16. The roller lock device of claim 12 further comprising a spring cap coupled to the housing and configured with recesses to receive roller springs coupled to the rollers, the recesses comprising centering features for centering the rollers on a center axis of the ramps.

17. The roller lock device of claim 12, wherein in a neutral state, each roller has two lines of contact with the ramp and one line of contact with the shaft, and wherein in a locked state each roller has one line of contact with the ramp and one line of contact with the shaft.

* * * * *